Patented Dec. 24, 1929

1,741,031

UNITED STATES PATENT OFFICE

WILBER B. MILLER, OF FLUSHING, NEW YORK, ASSIGNOR TO OXWELD ACETYLENE COMPANY, A CORPORATION OF WEST VIRGINIA

WELDING FLUX

No Drawing.   Application filed January 27, 1926. Serial No. 84,242.

The invention relates to fluxes for fusion welding.

When abutting edges of metal members are fused and caused to unite by the heat of the electric arc or the blowpipe flame, or when a metal rod or electrode is fused by one of the above methods and the molten metal is deposited for the purpose of welding abutting metal members or for building up or sheathing a single member, difficulty arises, as is well known, in bringing the fused metal into a solid condition in which it is clean, sound and homogeneous, firmly bonded to the adjacent metal, and not excessively altered in its chemical composition. To assist in bringing about the desired condition fluxes in wide variety have been employed.

From the great diversity of fluxes which have been proposed for such use and from the mediocre degree of success which has attended their use, it is evident that a full understanding of the functions and essential properties of such fluxes has not been attained. The following are the desirable qualities of a flux for most welding operations. The flux should melt readily and its surface tension when molten should be such that it will readily adhere to the work as the latter is heated, instead of falling away or being blown away. A dense and quiet liquid will be more stable in the welding position than a very thin or frothy liquid, and the flux should therefore produce a liquid of this nature. As the temperature is increased toward the welding point the fluidity of the molten flux should not become so great as to cause undue difficulty in holding it where desired. The flux should be substantially non-volatile at the welding temperature and furthermore should not evolve such quantities of gases, as by decomposition of its constituents or reaction among them, that the flux puffs or froths away from the surface of the molten metal. A flux of these properties will afford a protective blanket of maximum efficacy for the molten metal, and will protect the metal from oxidation throughout the entire temperature range where protection is desirable. The flux should also be a good solvent for metal oxide which may be produced in spite the protective action of the flux, and of course should add no deleterious ingredient to the fused metal and should evolve no fumes offensive to the welder.

I have found that the above requirements are met in admirable fashion by a flux consisting of a borosilicate glass, such as the sodium glass. The glass may be preformed or materials may be subjected to the welding heat so that they react to produce the desired glass. The melting point of the glass will be depressed by increasing contents of alkali and boric oxide, while its viscosity and hence stability in the upper temperature range will be increased by raising the silica content. The borosilicate glasses when in the fused state undergo relatively slight change in fluidity throughout a wide temperature range, and this property is one of the principal causes of their effectiveness when used as welding fluxes. The property is so strongly developed in the borosilicate glasses that it is exhibited by glasses of quite widely varying composition.

If a preformed glass is used it evolves no gases upon heating, while if the glass is formed in situ the reacting materials can be such that gases are not evolved. The borosilicate glasses are excellent solvents for most metal oxides and their oxide-dissolving power is exercised in an especially advantageous way when they are used as fluxes in welding with a chromium alloy, such as chrome iron. Such welding has heretofore been regarded as extraordinarily difficult since chromium oxide is very readily formed and is of such a character that it must be speedily and effectively dissolved else it will seriously impair the weld. A good protective slag over the molten metal is also especially desirable when welding with chromium alloys, particularly when the blowpipe process is used. Borosilicate glasses are accordingly very good fluxes for welding with chromium alloys.

A glass suitable for use as a flux can be cheaply and easily prepared by fusing ordinary borax, which is sodium tetraborate crystallized with ten molecules of water, together with silica, the latter preferably in finely divided form, until a homogeneous frit results.

The preferred proportions are from two to four parts of borax to one of silica, though higher proportions of borax may be used to produce fluxes for welding with alloys of lower melting point than chrome iron, the high borate glasses having sufficient viscosity where high welding temperatures are unnecessary. Satisfactory glasses contain $SiO_2$ 5 to 50%, $B_2O_3$ 20 to 65%, and base 15 to 30%. The alkaline earth oxides may replace the alkali metal oxides in whole or in part. The best results in welding chrome iron have been had with a glass made by fusing about 3.5 parts of borax with one part of silica and therefore containing about four parts of boric oxide to three parts of silica.

Glasses within the proportions given above are substantially insoluble in water but with higher alkali contents the solubility increases slightly. The fusion or frit is preferably poured into water, or onto a chill plate, and is powdered and applied to the weld in any suitable way. I prefer to make a paste of it using a suitable agglutinant such as gum arabic, dextrin, or shellac, and to apply this paste to the rod or electrode, or to the work, or to both, and let it solidify before starting to weld. The glass can of course be used as a core in a hollow electrode or welding rod. A simple water paste of the powdered glass may also be used, especially for application to the work.

I am aware that in the multiplicity of welding fluxes which have been proposed there are some which contain both boric oxide or a borate, and silica or a silicate, so that a borosilicate glass might be formed when the flux is heated to the welding temperature. In all such fluxes which have come to my attention any borosilicate glass produced would be only a minor constituent of the flux and would be intermixed with such a quantity of materials of undesirable properties that the glass would lose its identity and practically all its advantageous qualities would be sacrificed. For example, a flux has been proposed which contains 10% of borax and 5% of silica, the other 85% being alkali metal carbonates and bicarbonates. It will be obvious to those familiar with the chemical properties of the substances involved that in this flux any borosilicate glass formed would be so diluted with readily fusible bases that the character of the flux would be completely changed. Because of its lack of viscosity at elevated temperatures and its propensity for evolving carbon dioxide, this prior flux would not possess the advantages attained by the invention. A flux has also been proposed which may contain $KNaSiO_3$ and $B_2O_3$ together with a preponderating proportion of alkali metal and alkaline earth metal carbonates. The function of the silicate and boric oxide is said to be to liberate carbonic acid from the carbonates contained in the flux. While my invention does not require complete exclusion of ingredients other than borosilicate glasses, but on the contrary recognizes that auxiliary agents may be useful in the flux in some instances, all compositions embraced by the invention exhibit the characteristic properties of borosilicate glasses and do not contain diluting, low-melting, gas-forming, or other substances in such quantities as to destroy or counteract the desirable properties of the glasses. The words "consisting substantially of borosilicate glass" as used in the claims are intended to exclude all compositions wherein the advantageous properties of borosilicate glasses are seriously impaired by the admixture of other substances with the glass.

Certain subject-matter claimed herein is disclosed in my application Ser. No. 57,944, filed September 22, 1925.

I claim:

1. A welding flux in which, when proximately analyzed according to the following scheme, (a) $B_2O_3$; (b) $SiO_2$; (c) oxides of alkali and alkaline-earth metals; (d) undetermined; (e) volatile below welding temperatures; item (a) represents 20% to 65% of the aggregate items (a), (b), and (c); item (b) represents 5% to 50% of said aggregate; item (c) represents 15% to 30% of said aggregate; and said aggregate is large as compared with item (d).

2. The process of welding which comprises fusing metal and depositing the same on heated metal under a molten flux containing 20% to 65% of $B_2O_3$; 5% to 50% of $SiO_2$, and sufficient base to form a glass.

3. The process of welding which comprises fusing a chromium alloy and depositing the same on heated metal under a molten flux containing 20% to 65% of $B_2O_3$; 5% to 50% of $SiO_2$, and sufficient base to form a glass.

In testimony whereof, I affix my signature.

WILBER B. MILLER.